April 18, 1950    H. W. SCHWARZ ET AL    2,504,735
PROCESS OF PREPARING DRIED COFFEE EXTRACT
Filed Nov. 20, 1947
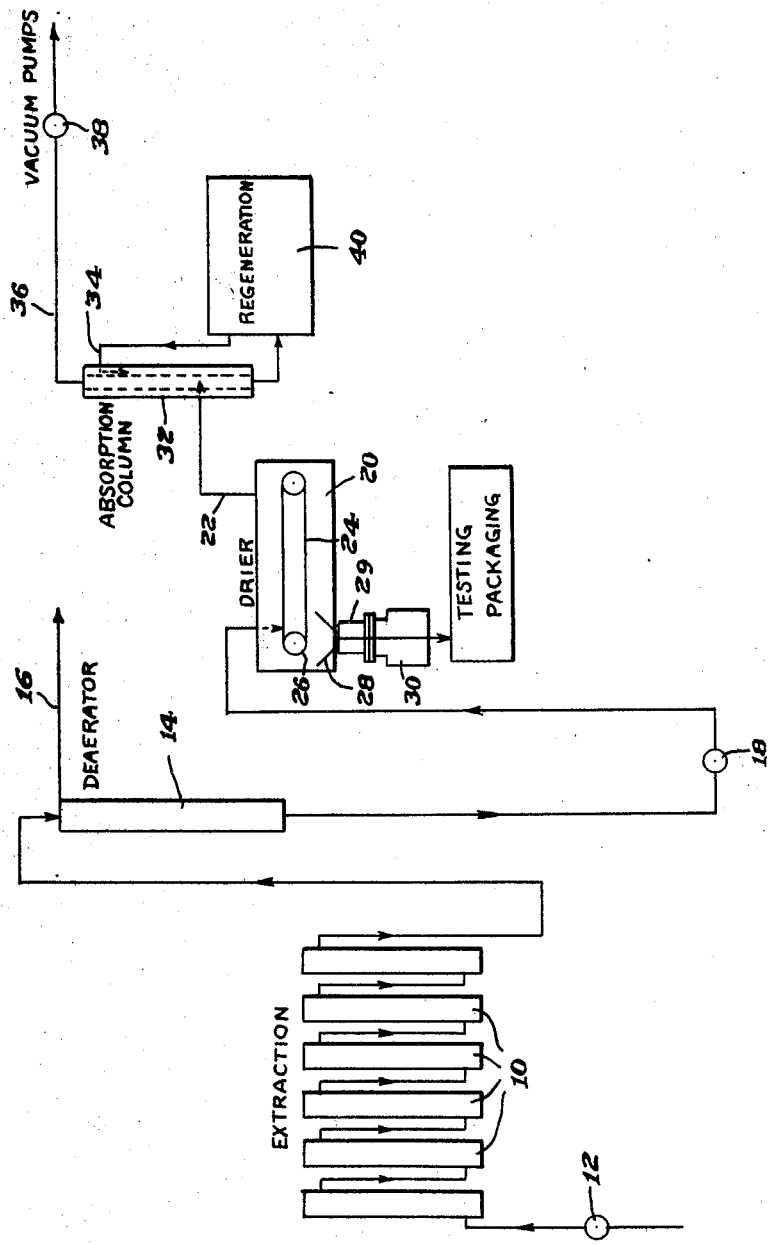
INVENTORS
HUGH W. SCHWARZ
EDWARD G. HELLIER
ALBERT L. SCHROEDER
BY Edgar H. Kent
ATTORNEY Patented Apr. 18, 1950

2,504,735

UNITED STATES PATENT OFFICE 2,504,735

PROCESS OF PREPARING DRIED COFFEE EXTRACT

Hugh W. Schwarz, Natick, Edward G. Hellier, Medfield, and Albert L. Schroeder, Brookline, Mass., assignors to National Research Corporation, Cambridge, Mass., a corporation of Massachusetts Application November 20, 1947, Serial No. 787,210

5 Claims. (Cl. 99—71)

This invention relates to a method of producing a pure dry soluble coffee extract.

Roasted coffee loses taste and aroma rapidly in storage, particularly after it is ground. Because of this difficulty and to simplify and improve the making of coffee beverage in home and restaurant, many attempts have been made in past years to produce a dried extract of freshly roasted coffee which could be stored without change for long periods of time and could, by simple solution in water, be made into coffee beverage having a taste and aroma comparable to coffee beverage made directly from freshly roasted coffee.

These prior attempts have, however, failed to fulfill this objective. It was found that known processes of drying the extract (except vacuum drying from the frozen state) to the low water content necessary to prevent deterioration in storage, resulted in such physical-chemical changes in the dried extract that coffee beverage made therefrom was of definitely inferior taste and aroma. And vacuum drying from the frozen state, because of the very long drying cycle, is so costly as to be impracticable for commercial drying of coffee extract.

In the effort to overcome this problem, resort has been had to the addition of modifying agents to the extract prior to drying for the purpose of preventing flavor and aroma changes and losses, and elaborate systems have been developed for catching volatiles given off in the roasting or extracting processes and returning them to the extract in order to compensate for the losses in drying. But none of these methods has been successful in producing a dried coffee extract having the desired storability, solubility, flavor and aroma characteristics.

An object of this invention is to provide a method of producing dried, quick-soluble, storable coffee extract without substantially impairing the taste and aroma characteristics of the extract. Another object is to provide such a method which does not require the addition of modifying adulterants to the coffee extract or the condensation and return of volatiles from the roasting or extracting process, and which is comparatively inexpensive to operate.

In order to keep properly under normal storage conditions coffee extract should be dried to a moisture content of not more than about 4% by weight, as a higher moisture content will, in relatively short storage periods, permit chemical reactions to take place which seriously alter and impair the initial characteristics of the dried product. Preferably, the water content is reduced below 2.5% by weight, as dried extract with higher moisture content does not keep properly at elevated temperatures such as are encountered during the summer months or in the south or the tropics, and a dried product having as much as 4% moisture content will become gummy and cake more quickly when exposed to the atmosphere.

Prior drying methods, where productive of such requisite low water content, have formed the dried product into dense, hard particles which were not freely soluble and which, to increase solubility, were usually pulverized into a fine powder or flour. This powder was of light brown color, more similar in appearance to cocoa than to coffee, which tended to prejudice acceptance of the product by the public. Furthermore, the powdered product was slow and difficult to dissolve, even in hot water.

Another object of our invention is to provide a novel process for drying coffee extract to the requisite low water content, which forms the dried product into a light, porous mass that readily breaks up into coffee-colored particle clusters of pleasing appearance, resembling crystals, which are instantly soluble, even in cold water.

A difficulty with prior extraction processes has been that they tended to remove excessive amounts of bitter tasting fats or oils into the liquid extract, which persisted in the dried product. Another object of this invention is to provide, in conjunction with our novel drying process, an improved coffee extraction step by which this difficulty is overcome.

Other objects and advantages of the invention will hereinafter appear.

We have determined that the qualities of dried coffee extract are directly related to the pressure under which the drying takes place and to the temperature and time of drying. Further, we have discovered that there are certain conditions of pressure, temperature and time of drying under which a dried coffee extract having the improved properties above set forth can be produced without freezing, at the low cost necessary for commercial use, and which are critical to the production of such a product. These conditions are:

1. Total pressure (free air plus evaporating moisture) on the product during drying maintained no higher than about 10 mm. Hg, preferably about 1 mm. Increase of the pressure above the preferred value of 1 mm. has an adverse effect upon taste, the adverse difference being readily detectable at pressures of 5 to 10 mm. and reaching substantial deterioration at pressures above about 10 mm. Furthermore, at pressures above the stated range it is difficult or impossible to satisfy the requisite conditions of temperature and time and to produce the desired quick-soluble crystal-like condition of the product.

2. Exposure of the extract during drying to a temperature of not less than about 110° F. nor more than 200° F., preferably 150° to 175° F. If the temperature exceeds about 200° F. the taste of the product is substantially impaired. The low limit is the approximate minimum temperature at which it is feasible to operate without freezing and at a cost sufficiently economical for commercial production.

3. A drying interval of not less than about 4 minutes nor more than about 30 minutes. The proper drying interval varies inversely with the temperature, the 4 minute minimum corresponding to drying temperatures at or immediately below 200° F. and the 30 minute maximum to a drying temperature of about 110° F. For the preferred drying temperature range of 150° to 175° F. the drying interval should be about 6 to 8 minutes. We have found that at the drying temperatures operable in our process, the extract, which is not frozen, will deteriorate after exposure to the heating for a certain length of time. For each temperature within our range of operative temperatures there is a corresponding time interval, within the general time range herein given, for which the extract may be processed without such deterioration, and which is also sufficient, under the other conditions of the process, to reduce the moisture content to the requisite low value set forth above.

In order to maintain the requisite low total pressure, the drying is conducted in a vacuum system exhausted to a free air pressure not exceeding 200 microns, preferably around 1 micron. Under these conditions, the bulk of the pressure during drying is due to the evaporating moisture. Since the rate of evaporation is very high, it is difficult to maintain the moisture pressure within the requisite low range. We have found, however, that this can be satisfactorily accomplished by the use of a moisture condenser of great efficiency and by a coordinated feed of the extract into the drying system.

We prefer to use as our moisture condenser a liquid chemical desiccant of high efficiency which is rapidly circulated through the vacuum system where it is exposed to and absorbs the evaporating moisture, and through a regenerating system in which the absorbed moisture is evaporated off. We have found that aqueous solutions of lithium halide salts, such as lithium chloride or lithium bromide are suitable desiccants when refrigerated to a sufficiently low temperature. We may, however, employ a refrigerating type condenser, for example as disclosed in United States Patent No. 2,406,682, which is kept at maximum efficiency by continued removal of the ice of condensing vapors substantially as fast as formed.

The rate of evaporation falls off sharply as the drying progresses. In order to maintain a substantially constant load on the condenser system and thus to prevent fluctuations in the pressure, we maintain a constant feed into the system of new extract to be dried and a constant withdrawal of completely dried extract at a rate adjusted to the capacity of the condenser. Thus the amount of moisture evaporating in the system at all times is kept substantially constant and the pressure of the evaporating moisture can be maintained at the required low value by the constant high efficiency condenser system.

It is important in our process that the extract be kept from freezing, because freezing so slows the rate of evaporation that it is difficult or impossible to obtain the requisite short drying cycle. Because of the high rate of evaporation and consequent cooling of the extract, even at the high drying temperatures employed in our process freezing will take place unless care is taken to prevent it.

To this end we prefer to make our extract to be dried of a high concentration such that its freezing point is well below 0° C. This may be done either by regulating the extraction process to produce a high concentration extract or by the use of a preconcentrating step such as low vacuum evaporation. In our process the concentration of the extract is from 30% to 60% solids, preferably about 35% solids. The concentrated liquid extract is fed into the vacuum as a thin, viscous film on a heating surface heated to the drying temperature. This film should be of the order of 0.002 to 0.012 inch in thickness, at the preferred concentration about 0.005 to 0.008 inch in thickness, so that the heat penetrates rapidly through it to the surface, keeping the film above the freezing point despite the rapid heat loss due to evaporation.

As the drying proceeds the film quickly becomes highly viscous and swells up to several times its original thickness, due to the formation of internal bubbles by moisture vapor and gases temporarily trapped beneath the surface of the viscous film. As the drying proceeds further, the film solidifies by moisture loss in this internally frothed condition and without substantial collapse so that the completely dried film has a myriad of internal pockets and voids. This structure, by reason of the separation which it produces between individual solid particles, imparts instant solubility to the dried product. Grinding is not necessary and, instead, the dried film readily fractures into irregularly shaped "nuggets" having the crystal-like structure and instant solubility which are distinguishing features of our product.

As previously stated, our drying process retains in the dried extract the taste and aroma qualities of the liquid extract from which it is made. Any extracting process capable of yielding a good quality of extract may be employed. However, for highest quality of end product, our drying process is preferably combined with an extracting step which our tests have shown produces an extract of superior quality.

In this preferred extraction step, the roasted and ground coffee to be extracted is packed in a succession of tubular containers or columns. Cold water, by which we mean water at ordinary tap water temperature of around 65 to 75° F., is forced through the columns in succession until the desired concentration of extract is obtained, the columns acting also to filter out insoluble solids entrained in the water. The columns are from time to time replenished with fresh coffee as needed. In this way we extract about 18% to 22% by weight of the coffee, the extract containing substantially all the desirable soluble solids of the coffee with a minimum of undesirable components. We have found that 22% is about the maximum that can be extracted from coffee to obtain a high quality extract, except with certain high grade, relatively expensive coffees, where a few per cent more may in some cases be safely extracted.

Our process will be further described in connection with the accompanying drawing which is a diagrammatic flow sheet illustrating a commercial practice of our invention.

Referring to the drawing, the roasted and ground coffee to be extracted is packed in a plurality of tubular containers or columns 10. Pure water is forced by a pump 12 through the columns in succession, from bottom to top, as indicated by the flow arrows. As previously stated, the water is preferably at tap water temperature. The water pressure and length of the columns are adjusted to yield an extract of predetermined concentration of soluble coffee solids, preferably about 35%. As one column becomes exhausted, it is cut out and replaced by a fresh column. The combined columns form a long filter bed which serves to trap insoluble solids entrained by the water. This extraction procedure is preferred but not essential, as other extraction methods may be employed.

From the extraction stage, the extract is passed to a deaerator which, as indicated in the drawing, is an elongated tubular column 14 having a connection 16 to a vacuum pumping system. The extract flows down the inner wall of the column where it is exposed to a moderate vacuum. After degassing, the extract is forced by a pump 18 through piping connections to a vacuum drier 20.

The drier indicated in the drawing is a generally rectangular sealed chamber having a connection at 22 to a vacuum pumping system capable of maintaining the free air pressure in the chamber below 200 microns, preferably about 1 micron. The chamber is preferably jacketed and heated, as by means of internal and external steam pipes. Within the chamber is located an endless belt 24 which extends horizontally and is continuously advanced about suitable supporting sprockets or rollers. This belt, which is of good conducting material such as metal, is heated to a temperature within the range previously mentioned, 110 to 200° F., preferably 150° to 175° F., by steam coils or other suitable heating means located between the upper and lower stretches of the belt.

The coffee extract is ejected through a spray nozzle onto the upper stretch of the belt as it starts its upper horizontal path at the end opposite that at which the vacuum connection is located. The rate of feed through the spray nozzle is so adjusted to the rate of advance of the belt as to form a thin liquid film of the extract on the belt, of substantially uniform thickness, between 0.002 and 0.012 inch, preferably about 0.005 to 0.008 inch, over the entire belt surface. As the belt advances toward the opposite end of the chamber, the water rapidly evaporates from the extract which quickly becomes highly viscous and froths internally as previously described, ultimately solidifying (by moisture loss, not freezing) in the internally frothed condition. The drying film adheres to the belt as it passes downwardly at the far end of the chamber and returns to the inlet end. The dried extract is scraped from the belt 26, the conditions being so regulated that it is fully dried to not more than 4% moisture content, preferably less than 2.5%, at that point, in a time interval between 4 and 10 minutes. The dried extract is received in a hopper 28 from which it passes to an air lock 29 and is removed from the vacuum system through the air lock and a vacuum dolly 30. The fluffy, porous dried film produced by the drying treatment is fractured by the scraper into small particles having the pocketed, crystal-like structure previously described, which are instantly soluble in hot or cold water and may be packed in sealed containers for consumer distribution without further treatment.

The water vapor evaporating from the extract passes out through the vacuum connection 22 to a vapor pumping system which has a pumping speed capable of maintaining the total pressure in the drying chamber no higher than 10 mm., preferably about 1 mm. As indicated in the drawing, and preferably, this vapor pumping system comprises an absorption column 32 located in the connection of the drying chamber to the vacuum pumping system. A constant flow of liquid desiccant solution is maintained down the inner wall of the column from a supply line indicated at 34. The vapors and gases from the drying chamber enter the interior of the column near the base and flow upwardly, the vapors being absorbed so that virtually only the non-condensible gases pass through the connection line 36 at the top of the column to the vacuum pumping system 38. After passing through the column, the desiccant solution with absorbed moisture passes to a suitable regenerating system 40, normally including an evaporator in which the absorbed moisture is evaporated off by heating and discharged from the system, a refrigerating system for cooling the solution after removal of the absorbed water vapor by the evaporator and a heat exchanger through which the cold solution flows from the absorption column to the evaporator and the heated solution flows from the evaporator to the refrigerating system. The desiccant solution is preferably an aqueous solution of lithium chloride which is supplied to the absorption column at a concentration of about 30% lithium chloride and a temperature of about −5° F.

In the preferred practice, employing apparatus as above described, a pure coffee extract of approximately 35% dissolved solids concentration, applied to the drying belt in a layer of about 0.005 to 0.008 inch thickness, is dried without freezing under a total pressure of about 1 mm. at a belt temperature between 150° and 175° F. to a water content of less than 2.5% in from 6 to 8 minutes. Thorough tests have established that the pure dried product so produced is much more quickly soluble and produces better tasting coffee, both to a marked extent, than the dried coffee extracts of the prior art. Our tests have also established that these improvements are obtained only if the pressure, temperature and time of drying are maintained within the critical limits hereinabove set forth.

In the foregoing description and appended claims, references to moisture content are as determined by the Karl Fischer method, described by Wernimont and Hopkinson in Industrial and Engineering Chemistry, vol. 15, 1943, page 27.

We claim:

1. The process of preparing dry, soluble coffee which comprises forming a liquid coffee extract consisting essentially of water and from 30% to 60% by weight soluble coffee solids, providing an evacuated chamber which is maintained at a total pressure of not greater than 4 mm. Hg by means of a water vapor pumping system, substantially continuously introducing said extract into said chamber so as to maintain a substantially constant load on said pumping system and a substantially uniform low partial pressure of water vapor in said chamber, directing said introduced extract onto a heated surface in said chamber to form a film of said extract of a thickness between 0.005 and 0.008 inch on said surface, said surface being heated to a temperature between 150° F and 200° F., said low pressure and the heat of said surface causing substantially immediate foaming of said film without freezing thereof, maintaining said foaming film on said heated surface under said low total pressure for not less than 4 nor more than 8 minutes without disturbing said film, thereby reducing by evaporation the moisture content of said film to not more than 4% by weight, and then removing said dried extract from said surface.

2. The process of preparing dry, soluble coffee which comprises forming a liquid coffee extract consisting essentially of water and from 30% to 60% by weight soluble coffee solids, providing an evacuated chamber which is maintained at a total pressure of not greater than 4 mm. Hg by means of a water vapor pumping system, substantially continuously spraying said extract into said chamber so as to maintain a substantially constant load on said pumping system and a substantially uniform low partial pressure of water vapor in said chamber, directing said sprayed extract onto a moving heated surface in said chamber to form a film of said extract of a thickness between 0.005 and 0.008 inch on said surface, said moving surface being heated to a temperature between 150° F. and 200° F., said low pressure and the heat of said moving surface causing substantially immediate foaming of said film without freezing thereof, maintaining said foaming film on said heated surface under said low total pressure for not less than 4 nor more than 8 minutes without disturbing said film, thereby reducing by evaporation the moisture content of said film to not more than 4% by weight, and then removing said dried extract from said moving surface.

3. The process of preparing dry, soluble coffee which comprises forming a liquid coffee extract consisting essentially of water and from 30% to 60% by weight soluble coffee solids, providing an evacuated chamber which is maintained at a total pressure of not greater than 4 mm. Hg by means of a water vapor pumping system, substantially continuously spraying said extract into said chamber so as to maintain a substantially constand load on said pumping system and a substantially uniform low partial pressure of water vapor in said chamber, directing said sprayed extract onto a moving heated surface in said chamber to form a film of said extract of a thickness between 0.002 and 0.012 inch on said surface, said moving surface being heated to a temperature between 150° F. and 200° F., said low pressure and the heat of said moving surface causing substantially immediate foaming of said film without freezing thereof, maintaining said foaming film on said heated surface under said low total pressure for not less than 4 nor more than 8 minutes without disturbing said film, thereby reducing by evaporation the moisture content if said film to not more than 4% by weight, and then removing said dried extract from said moving surface.

4. The process of preparing dry, soluble coffee which comprises forming a liquid coffee extract consisting essentially of water and soluble solids derived from coffee, providing an evacuated chamber which is maintained at a total pressure of not greater than 4 mm. Hg by means of a water vapor pumping system, substantially continuously spraying said extract into said chamber so as to maintain a substantially constant load on said pumping system and a substantially uniform low partial pressure of water vapor in said chamber, directing said sprayed extract onto a moving heated surface in said chamber to form a film of said extract of a thickness between 0.002 and 0.012 inch on said surface. said moving surface being heated to a temperature between 150° F. and 200° F., said low pressure and the heat of said moving surface causing substantially immediate foaming of said film without freezing thereof, maintaining said foaming film on said heated surface under said low total pressure for not less than 4 nor more than 8 minutes without disturbing said film, thereby reducing by evaporation the moisture content of said film to not more than 4% by weight, and then scraping said dried extract from said moving surface.

5. The process of preparing dry, soluble coffee which comprises forming a liquid coffee extract consisting essentially of water and soluble solids derived from coffee, providing an evacuated chamber which is maintained at a total pressure of not greater than about 1 mm. Hg by means of a water vapor pumping system, substantially continuously spraying said extract into said chamber so as to maintain a substantially constant load on said pumping system and a substantially uniform low partial pressure of water vapor in said chamber, directing said sprayed extract onto a moving heated surface in said chamber to form a film of said extract of a thickness between 0.002 and 0.012 inch on said surface, said moving surface being heated to a temperature between 150° F. and 200° F., said low pressure and the heat of said moving surface causing substantially immediate foaming of said film without freezing thereof, maintaining said foaming film on said heated surface under said low total pressure for not less than 4 nor more than 30 minutes without disturbing said film, thereby reducing by evaporation the moisture content of said film to not more than 4% by weight, and then scraping said dried extract from said moving surface.

HUGH W. SCHWARZ.
EDWARD G. HELLIER.
ALBERT L. SCHROEDER.

REFERENCES CITED

The following references are of record in the file of this patent:

UNITED STATES PATENTS

| Number | Name | Date |
|---|---|---|
| 1,478,940 | Chalas | Dec. 25, 1923 |
| 1,891,383 | Giffen et al. | Dec. 20, 1932 |
| 2,071,011 | Wendt | Feb. 16, 1937 |
| 2,149,876 | Wendt et al. | Mar. 7, 1939 |
| 2,379,427 | Fetzer | July 3, 1945 |
| 2,431,496 | Natelson et al. | Nov. 25, 1947 |